United States Patent Office 3,032,520
Patented May 1, 1962

3,032,520
ANTIOZIDANTS FOR RUBBER COMPOSITIONS
Robert F. Shaw, Davenport, Iowa, assignor to the United States of America as represented by the Secretary of the Army
No Drawing. Filed Nov. 25, 1953, Ser. No. 394,526
9 Claims. (Cl. 260—28.5)
(Granted under Title 35, U.S. Code (1952), sec. 266)

The invention described herein may be manufactured and used by or for the Government for governmental purposes without the payment to me of any royalty thereon.

This invention relates to improvements in the preservation of natural and synthetic rubber compositions, and more specifically to compositions and procedures which may be used with certain natural and synthetic rubbers to prevent cracking caused by weathering—and more particularly that caused by the presence of ozone in the ambient atmosphere. The term "synthetic rubber" refers broadly to any substance which may be prepared synthetically which has physical properties resembling those of rubber. All synthetic, rubberlike materials may be grouped under the general heading of elastomers.

The desirable physical characteristics of both natural rubbers and elastomers are known to be adversely affected by many deteriorating agents including ozone, heat, oxygen, light, fungi, moisture and certain metallic ions; and the most severe of these adverse effects is known to be caused by ozone, heat and oxygen in the order named. It is also known that some elastomers such as butyl, Thiokol and silicone are not subject to cracking due to the presence of ozone in the atmosphere, although the latter is very heat resistant and the former two are not. There is reason to believe that the immunity of these substances to ozone cracking may be attributed to the high state of saturation of the polymer. Elastomers containing butadiene—styrene and butadiene—acrylonitrile polymers, and natural rubber, on the other hand are most susceptible to ozone cracking, due possibly to the presence of a greater number of unsaturated or double bonds. Atmospheric ozone concentrations vary from close to zero to ten parts per hundred million (p.p.h.m.) at Rock Island, Illinois, and increase with higher ambient temperatures and increased air movements. Ozone concentrations up to 50 p.p.h.m. have been reported at Los Angeles and in Alaska. Rubber products which must be used in the vicinity of electrical discharge equipment are subjected to ozone concentrations as high as 10,000–15,000 p.p.h.m. (.015 percent by volume) and laboratory equipment has been designed which provide these ozone concentrations. See A.S.T.M. designation: D470–52T.

The prior art teachings, when applied to the protection of these rubber and rubberlike products containing unsaturated polymers, from the adverse effects of weathering generally have not proved satisfactory in preventing ozone cracking, particularly since cracking of these products does not occur when the rubberlike product is unstressed at room temperature. The principle of coating the rubber surfaces as proposed by the prior art was thoroughly investigated and approximately forty commercial and experimental coatings were evaluated for ageing and weather resisting qualities. It was found that not more than six months protection against outdoor ageing may be expected using currently available coatings applied to give a 4–7 mil thickness on specimens elongated 50%. Such coatings would have to be 20–40 mils in thickness to show promise of fufilling long term storage requirements of 2–3 years.

It has also been known in the prior art to incorporate directly into the rubber or elastomer composition various oils, waxes, and other organic and inorganic substances and their derivatives, for preventing deterioration. For example, ozone cracking can be prevented by protecting the rubber or rubberlike surface from contact with the atmosphere by means of protective coatings of 4–8 mils of neoprene, or 15–20 mils of vinyl are adequate. However these coatings are costly to apply to items such as tires mounted on vehicles. In addition, the coating is subject to rupture, which results in severe ozone cracking due to concentrated stress relaxation of the rubber substrate at the point of rupture. Wrappers based on polymer films or rubber impregnated paper envelopes or special paper wrappings are adequate in preventing cracking by exclusion of air. Veneers made from ozone resistant polymers are satisfactory on large truck tires. Rubber compositions may also be protected from ozone by incorporation of 3–15 parts per hundred parts of polymer of certain waxes during manufacture. The resulting wax film is of value under static conditions but is practically useless, and may be harmful under dynamic conditions. U.S. Patent Numbers 2,605,250 and 2,632,770 disclose the treatment of natural and synthetic rubbers by adding N-N′-disecondary butyl-p-phenylene diamine and certain oxalate derivatives thereof to prevent cracking due to weathering involving either static or dynamic stress while subjected to the influence of oxygen, ozone, heat and/or light. The former substance, known commercially as Tenamene II, was one which gave promising results but as pointed out by the patentee, although it proved effective as an anti-cracking agent, it is too toxic and volatile to permit its commercial use.

It is an object of the present invention to provide compositions of natural rubber and synthetic rubberlike materials which will resist deterioration caused by the presence of ozone in the atmosphere. It is a further object to provide agents which may be incorporated in natural rubber and elastomeric mixes which will be stable over a period of time and which will not crack when subjected to stress in the presence of ozone. A still further object is to disclose methods for incorporating non-toxic and non-volatile anti-ozidants into the rubber and rubber-like compositions in a manner which will insure their migrating to the surface of the product to protect such surfaces from ozone deterioration. Still a further object is to provide antiozidant and antioxidant compositions and methods of using them which will protect natural rubber and rubber-like products by cooperating chemically one with the other to render said products stable and free from deterioration due to atmospheric exposure under stress. These and other objects will be apparent from the following description.

The formation by ozone of a film on the rubber product surface which becomes brittle and cracks under stress to present a fresh surface subject to further attack best explains the cracking nature of ozone on rubber and rubberlike products. According to my invention, I have found that the incorporation of certain organic amine compounds offer the most promise in protecting rubber and rubberlike products from deterioration of the kind described herein. In particular I may use N,N′-disecondary butyl-p-phenylene-diamine or other alkyl homologs; N,N′-disecondary butyl benzidine—or other non-condensed polycyclic aromatic diamines having N-substituted alkyl groups; or p-p′-diamine diphenyl methane are especially effective. I have also found however that many of these substances, although effective as antiozidants, are either too toxic or too volatile or both and that it is therefore more practicable to use similar homologous compounds of higher molecular weight and lower vapor pressure but have found that the solubility of the antiozidant in the rubber compound, and the migration or diffusion of the antiozidant through the compound, are prime factors in the relative effectiveness of the antiozidant, as these factors determine the maximum availability of the antiozidant at the surface of the rubber product, and likewise determine the maximum ozone concentration which can be resisted at said surface. I have found that the addition of 1 to 3 parts of certain wax substances to the rubber composition, along with certain selected antiozidants, has the effect of obtaining maximum migration of non-volatile antiozidants, although the minor amounts of wax which are sufficient for this purpose are insufficient to alter other properties or to provide protection by means of wax alone. It is possible in accordance with my invention to select certain antiozidant-wax combinations to protect otherwise destructible compositions at various ozone concentration levels. It is evident that accelerated testing at 25 or 50 p.p.h.m. ozone requires resistance at a continuous high ozone concentration, while outdoor testing requires resistance to intermittent ozone concentrations ranging from 0–50 p.p.h.m. but usually in the range of 3 to 5 p.p.h.m.

Addition of the antiozidants, wax and antioxidants directly to the polymer in the latex stage, or to the rubber mixture when it is being compounded has proved satisfactory. Examples of the formulations with which the compounds shown in the tabulation of Tables I and II were used are:

FORMULATION I

Natural Rubber Composition

| | Parts by weight |
|---|---|
| Smoked sheets | 100 |
| Carbon black | 50 |
| Zinc oxide | 5 |
| Stearic acid | 1 |
| Sulfur | 1.75 |
| Neozone D (antioxidant) | 1 |
| Santocure [1] (accelerator) | 1 |
| Antiozidant, wax, as shown in Table I. | |

[1] N-cyclohexyl-2-benzothiazole sulfenamide, as shown in Table I.

FORMULATION II

GR–S Rubber

| | Parts by weight |
|---|---|
| Polymer (90% butadiene–10% styrene) | 100 |
| Carbon black | 50 |
| Stearic acid | 2 |
| Zinc oxide | 3 |
| Sulfur | 1.75 |
| Santocure (accelerator) | 1 |
| Neozone D (antioxidant) | 1 |
| Agerite Resin D (antioxidant) | 1 |
| Antiozidant, wax, as shown in Table I. | |

FORMULATION III

Nitrile Rubber

| | |
|---|---|
| Paracril A (butadiene 82%–acrylonitrile 18%) | 100 |
| Carbon black | 100 |
| Zinc oxide | 5 |
| Stearic acid | 1 |
| Agerite Resin D (antioxidant) | 1 |
| Accelerator | 1.5 |
| Sulfur | 1 |
| Plasticizer | 10 |
| Antiozidant, wax, as shown in Table I. | |

I have found that all waxlike materials are not suitable as migration agents for my purpose as many of them remain in solution in the rubber. In general the amorphous and microcrystalline paraffin waxes have proved satisfactory and the best results are obtained by a blend of these two forms.

Commercial products which may be used for my purpose are:

Heliozone (see U.S. Patent Number 1,832,964), light yellow waxy flakes having a melting point of approximately 73° C. and specific gravity of 0.90; Sun Proof Super, pale yellow wax flakes manufactured by the Naugatuk Chemical Company, Naugatuck, Connecticut, having a melting range of 71–75° C. and a specific gravity of 0.93; Witco Sunolite, made by Witco Chemical Company, 75 East Wacker Drive, Chicago, Illinois, a blend of waxy hydrocarbons having a melting range of 62–67° C. and a specific gravity of 0.90.

As antioxidants I prefer to use substituted diaryl secondary amines containing two to three benzene nuclei in the molecule, specific examples of which are:

"Agerite Resin D"

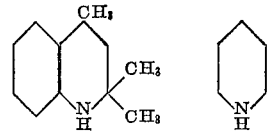

Polymerized 2,2,4-trimethyl-1,2-di-hydroquinoline

"Neozone D"

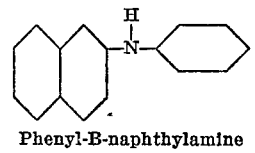

Phenyl-B-naphthylamine

The compounds which are disclosed herein as antiozidants, when employed in rubber and rubberlike compositions, are substituted secondary diamines containing an arylene radical consisting of from 1 to 3 benzene rings, and which may or may not have alkyl groups interspersed between the rings. Compounds of this type may be prepared by the methods disclosed in U.S. Patent Numbers 2,323,948 and 2,381,015. Examples of such compounds used for the purpose of this invention are listed in Table I, where the results of tests of their antiozidant properties, when used in the GR–S, GR–A and natural rubber formulations set forth herein above, are tabulated. The formulations were prepared in accordance with A.S.T.M. designation: D15–52T, and the antiozidant effects were substantially the same for a given antiozidant compound for either formulation.

The first and last columns of Table I contain numerals identifying the antiozidant compounds in the list below the table. The next two columns contain the parts per hundred parts of rubber hydrocarbon of antiozidant compound and wax used respectively. The next two columns refer to the results of observation of samples which were exposed under tension to air containing 25±5 p.p.h.m. ozone in an ozone cabinet built in accordance with A.S.T.M. designation: D1149–51T. The specimens were elongated 20% in aluminum fixtures (columns headed 20% stress) and also bent into a loop in accordance with A.S.T.M. designation: D518–44 (columns headed B.L.). All data pertaining to ozone cracks is given as the time required for the first crack to appear under 20 magnifications for accelerated tests and under 5 magnifications for outdoor tests. Explanation of the symbols and notations used in reporting the observed results in Tables I and II are as follows: H=hour; D=day; W=week; M=month; *=crack free-test continuing; B.L.=bent loop; T="Tenamene II" (compound number 2 in the list accompanying Table I); N="Neozone D"

(phenyl-B-naphthylamine); A="Agerite Resin D" (2,2,4-trimethyl-1,2-dihydroquinoline).

TABLE I.—TIME TO FIRST CRACK FOR COMPOUNDS CONTAINING VARIOUS ANTIOZIDANTS WITH AND WITHOUT WAX

| No. | Antiozidant amt. in parts per hundred of rubber formula | Wax | Ozone cabinet tests | | Outdoor tests | |
|---|---|---|---|---|---|---|
| | | | 20% stress | B.L. | 20% stress | B.L. |
| 1 | None | None | 2 H | 2 H | 1 D | 1 D. |
| 2 | 2.0 | None | 18 M* | 4 M | 10 M* | 10 M*. |
| 2 | 4.0 | None | | 13 M | 24 M* | 16 M*. |
| 3 | 2.7 | | 12 D | 3 M | 6 M | 17 M*. |
| 3 | 5.4 | | 5 M | | 19 M* | 18 M. |
| 3 | 5.4 | 1 | 10 M | 4 M | 14 M* | 14 M* |
| 4 | 2.0 | None | 10 D | 3 D | 5 M | 6 M* |
| 4 | 4.0 | None | | 1 M | 7 M* | 7 M*. |
| 4 | 2.0 | 1 | 6 M* | 3 D | 7 M* | 7 M*. |
| 4 | 4.0 | 1 | | 6 M* | 7 M* | 7 M*. |
| 5 | 2.9 | 1 | 3 D | 3 D | 9 M* | 9 M*. |
| 6 | 2.5 | None | 4 H | 2 H | 3 D | 3 D. |
| 6 | 4.9 | None | 4 D | 4 D | 7 D | 7 D. |
| 6 | 2.5 | 1 | 2 M | 4 D | 10 M | 10 M. |
| 6 | 4.9 | 1 | 7 M | 2 W | 14 M | 15 M*. |
| 7 | 2 | None | 2 H | 2 H | 3 D | 3 D. |
| 7 | 4 | None | 3 H | 3 H | 7 D | 7 D. |
| 7 | 2 | 1 | 1 D | 2 H | 12 M | 11 M. |
| 8 | 2 | None | 2 H | 2 H | 3 D | 3 D. |
| 8 | 4 | None | 2 H | 2 H | 7 D | 7 D. |
| 8 | 2 | 1 | 1 D | 2 H | 9 M | 10 M. |
| 8 | 4 | 1 | | 1 D | 6 M* | 6 M*. |
| 9 | 3.4 | None | 2 H | 2 H | 3 D | 3 D. |
| 9 | 6.8 | None | 3 D | 1 D | 17 M* | 17 M*. |
| 9 | 6.8 | 1 | 2 M | 1 M | 17 M* | 17 M*. |
| 9 | 3.4 | 1 | 1 D | 3 H | 15 M* | 10 M. |
| 10 | 2 | None | 7 M | 3 M | 1 M | 5 M. |
| 11 | 2 | None | 9 M | 4 M | 3 M | 6 M. |
| 12 | 3.7 | None | 3 M | 3 M | 4 M | 4 M. |
| 13 | 2.2 | None | 3 D | 8 H | 3 M | 3 M. |
| 14 | 2.4 | None | 2 D | 4 H | 2 M | 3 M. |
| 15 | 2.4 | None | 2 H | 2 H | 1 D | 1 D. |
| 16 | 2.5 | 1 | 7 H | 5 H | 11 M* | 7 M. |
| 17 | 2.0 | 1 | 4 M | 6 D | 6 M | 10 M*. |
| 18 | 2.0 | 1 | 7 M* | 7 M* | 7 M* | 7 M*. |
| 19 | 2.0 | 1 | | | 3 W | 3 W. |
| 20 | 3.0 | 1 | | 2 W* | 2 W* | 2 W*. |
| 21 | 3.0 | 1 | | 2 W* | 2 W* | 2 W*. |
| 22 | 3.0 | 1 | | 2 W* | 2 W* | 2 W*. |
| 23 | 3.0 | 1 | | 2 W* | 2 W* | 2 W*. |
| 24 | 3.0 | 1 | | 2 W* | 2 W* | 2 W*. |
| 25 | 3.0 | 1 | | 2 W* | 2 W* | 2 W*. |
| 26 | 3.0 | 1 | | 2 W* | 2 W* | 2 W*. |

1. None—Control.
2. N,N'-disecondary butyl-p-phenylenediamine.
3. N,N'-disecondary butyl benzidine.
4. P,P'-diaminodiphenyl methane.
5. N,N'-diphenyl-p-phenylenediamine.
6. N,N'-disecondarybutyl-1,4-naphthalenediamine.
7. N,N'-bis-(p-secondarybutylaminodiphenyl)-2,3-butanediamine.
8. N,N'-bis-(p-secondarybutylaminophenyl)-2,3-butanediamine.
9. N,N'-disecondarybutyl-p-terphenylene diamine.
10. N,N'-disecondarybutyl-2-methoxy-p-phenylenediamine.
11. N,N'-disecondary-butyl-2-methyl-p-phenylenediamine.
12. 2,5-di-4 (secondary-butylamine)-phenylamino hexane.
13. 1-secondary-butylamino-4,1-(2,5-dimethyl-pyrrolidine)-benzene.
14. 1,1-di-2,5-dimethyl-pyrrolidine-1,4-benzene.
15. 1,1-di-2,5-dimethyl-pyrrole-1,4-benzene.
16. N,N'-di-secondary-butyl-1,2,3,4-tetra-hydro-5,8-naththalenediamine
17. p-Phenylenediamine.
18. Benzidine.
19. N,N'-diphenyl benzidine.
20. N,N'-di-octyl-p-phenylenediamine.
21. N,N'-di-nonyl-p-phenylenediamine.
22. N,N'-dimethyl decyl-p-phenylenediamine.
23. N,N'-di (1-methyl dodecyl)-p-phenylene diamine.
24. N,N'-di (1-methyl octadecyl)-p-phenylenediamine.
25. N,N'-di (1-methyl hexadecyl)-p-phenylenediamine.
26. N,N'-di (1-methyl octyl)-p-phenylenediamine.

It will be noted that there is a lack of good correlation between the results of the ozone cabinet tests and the outdoor exposure tests. In general, when a compound performs well in the ozone cabinet it invariably holds up well in the outdoor exposure tests. If a compound fails within a short time in the ozone cabinet it does not necessarily follow that it will fail in a correspondingly short time out of doors. The absence of agreement in results between these two tests may depend upon the solubility of the antiozidant in the rubber compound and the rate of migration of the antiozidant to the surface of the rubber. In the ozone cabinet the specimens are exposed to an atmosphere containing 25±5 p.p.h.m. ozone, and if the antiozidant is slow in getting to the surface the rate at which it is used up exceeds the rate at which it is replenished, thereby leaving the unsaturated rubber polymer open to attack by ozone. It has been found that the antiozidant properties of the present invention are greatly enhanced by the incorporation of wax in the composition as a migration aid to bring the antiozidant to the surface of the vulcanizate.

I have also discovered that when certain diaryl secondary amines containing two to three benzene nuclei in the molecule, which substances are known as effective antioxidants; are included in proportions not greater than one part per hundred parts of rubber polymer, they are completely ineffective as antiozidants. But when these antioxidants are included along with the antiozidant Tenamene II (see No. 2 in Table I) they synergistically enhance the antiozidant properties of the composition as a whole. A special study of this phenomenon was made, the results of which are set forth in Table II.

TABLE II.—SYNERGISM STUDY—TIME TO FIRST CRACK

| Antiozidant and/or antioxidant | Ozone cabinet tests | | Outdoor tests | |
|---|---|---|---|---|
| | 20% stress | B.L. | 20% stress | B.L. |
| "Neozone D" "Agerite Resin D" "Tenamene II" | 2 H | 2 H | 1 D | 1 D. |
| "Neozone D" "Agerite Resin D" "Tenamene II" | 11 M | 4 M | 13 M* | 13 M*. |
| "Tenamene II" "Agerite Resin D" | 9 M* | 2 M | 13 M* | 13 M*. |
| "Tenamene II" "Neozone D" | 13 M* | 2 W | 8 M | 6 M. |
| Tenamene II | 7 M | 2 W | 8 M | 4 M. |
| None | 2 H | 2 H | 1 D | 1 D. |
| "Neozone D" | 2 H | 2 H | 1 D | 1 D. |
| "Agerite Resin D" | 2 H | 2 H | 1 D | 1 D. |

It will be apparent to those skilled in the art that many variations may be made in the foregoing detailed description of the invention without departing from the spirit and scope thereof. I therefore intend to be limited only in accordance with the following claims:

1. A composition comprising a major proportion of a material selected from the class consisting of natural and synthetic rubbers, said material being subject to deterioration due to the action of ozone, from 1 to 3% of a microcrystalline wax, and up to 6.8 percent of a compound having the general formula

R—NH—A—NH—R wherein R represents an alkyl grouping having at least four carbon atoms and A represents an arylene radical consisting of from 1 to 3 benzene nuclei.

2. The composition of claim 1 in which the rubber is natural rubber.

3. The composition of claim 1 in which the rubber is a butadiene-styrene copolymer.

4. The composition of claim 1 in which the rubber is a butadiene-acrylonitrile copolymer.

5. The composition of claim 1 in which the compound having the general formula R—NH—A—NH—R is N,N'-disecondary-butyl benzidine.

6. The composition of claim 1 in which the compound having the general formula R—NH—A—NH—R is N,N'-disecondary-butyl-p-phenylenediamine.

7. A composition comprising a major proportion of a material selected from the class consisting of natural and synthetic rubbers, said material being subject to deterioration due to the action of ozone, from 1 to 3% of a microcrystalline wax and an antioxidant selected from the class consisting of phenyl-beta-naphthylamine and 2,2,4-trimethyl-1,2-dihydroquinoline and up to 6.8 percent of a compound having the general formula

R—NH—A—NH—R wherein R represents an alkyl grouping having at least four carbon atoms and A represents an arylene radical consisting of from 1 to 3 benzene nuclei.

8. A method of rendering a rubber composition selected from the class consisting of natural and synthetic rubber, resistant to deterioration by atmospheric ozone, which comprises incorporating therein, prior to vulcanization from 1 to 3% of a microcrystalline wax, and up to 6.8% of N,N'-disecondary-butyl-1,4-naphthalene diamine.

9. A method of rendering a rubber composition selected from the class consisting of natural and synthetic rubber, resistant to deterioration by atmospheric ozone, which comprises incorporating therein, prior to vulcanization from 1 to 3% of a microcrystalline wax, an antioxidant selected from the class consisting of phenyl-beta-naphthylamine and 2,2,4-trimethyl-1,2-dihydroquinoline, and up to 6.8% of N,N'-disecondary-butyl-1,4-naphthalene diamine.

References Cited in the file of this patent

UNITED STATES PATENTS

| | | |
|---|---|---|
| 2,009,530 | Sloan | July 30, 1935 |
| 2,013,319 | Semon | Sept. 3, 1935 |
| 2,216,524 | Sibley | Oct. 1, 1940 |
| 2,705,224 | Hill | Mar. 29, 1955 |
| 2,798,860 | Hand | July 9, 1957 |

FOREIGN PATENTS

| | | |
|---|---|---|
| 115,423 | Australia | July 9, 1942 |